(No Model.)
W. A. SMITH.
BICYCLE.
No. 516,554. Patented Mar. 13, 1894.
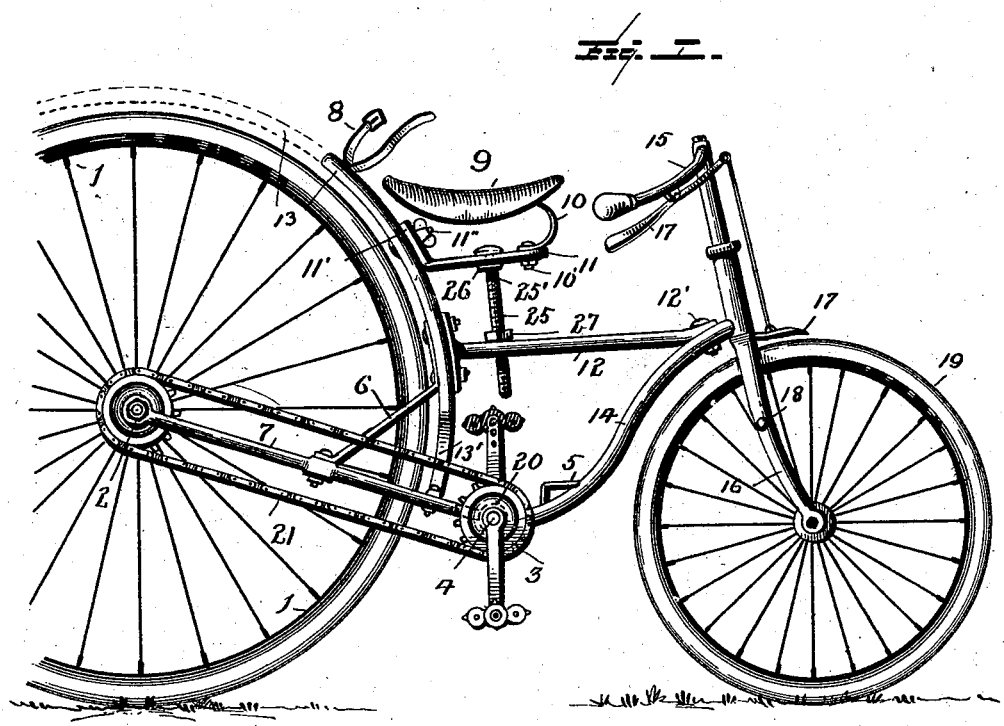
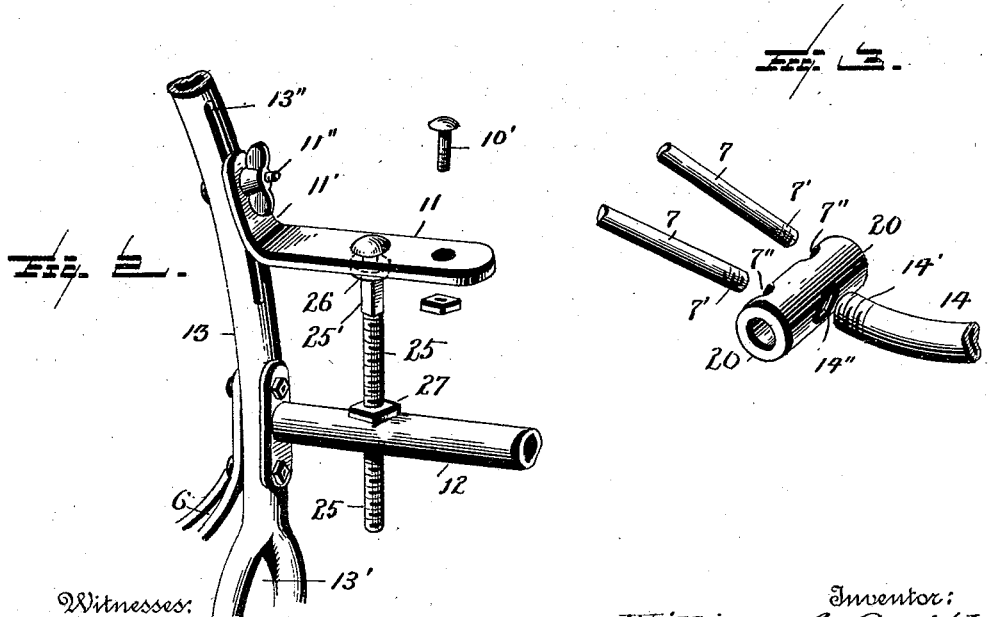
Witnesses:
L. C. Hills.
J. H. Jochum Jr.
Inventor:
William A. Smith,
by Collamer & Co.,
Attorneys.
THE NATIONAL LITHOGRAPHING COMPANY,
WASHINGTON, D. C.

UNITED STATES PATENT OFFICE.

WILLIAM ARTHUR SMITH, OF ST. JAMES, MINNESOTA.

BICYCLE.

SPECIFICATION forming part of Letters Patent No. 516,554, dated March 13, 1894.

Application filed June 10, 1893. Serial No. 477,196. (No model.)

*To all whom it may concern:*

Be it known that I, WILLIAM ARTHUR SMITH, a citizen of the United States, and a resident of St. James, Watonwan county, State of Minnesota, have invented certain new and useful Improvements in Bicycles; and my preferred manner of carrying out the invention is set forth in the following full, clear, and exact description, terminating with claims particularly specifying the novelty.

This invention relates to velocipedes, and more especially to the saddles used on bicycles of the safety type; and the object of the same is to effect certain improvements in the means for adjusting the support for the seat so as to accommodate the machine to a larger or smaller rider.

A further object is the provision of special means for adjusting the framework in order to tighten the rear driving chain and yet not spring the frame work.

To this end the invention consists in the construction hereinafter more fully described, and as illustrated in the drawings, wherein—

Figure 1 is a side elevation of this machine complete. Fig. 2 is a perspective detail of the seat and its adjustment. Fig. 3 is a similar detail illustrating the boxing for the crank shaft and the means for adjusting the frame in said boxing.

In the said drawings, the numeral 16 designates the front fork having the usual foot rests 18, handle bar 15, and brake 17, and 19 is the front wheel journaled in this fork.

1 is the rear wheel which by preference is about twice the diameter of the front wheel in order to increase the speed of the machine as well as to serve in the nature of a balance wheel, since both wheels are preferably provided with heavy rubber tires. The rear wheel has a sprocket 2 on its shaft which is connected by a chain 21 with another sprocket 3 on the crank shaft 4, and the latter carries the pedals in the usual manner.

One feature of my invention consists in a special construction of framework which is especially adapted for use in a bicycle whose wheels are relatively proportioned as above described. This framework consists of a front bar 14 pivoted at its upper end to the fork 16 and having threads 14' at its lower end adapted to screw into a threaded opening 14'' in the boxing 20 wherein is journaled the crank shaft 4. 7 7 are two rear bars having bearings at their rear ends wherein is journaled the shaft of the rear wheel, and the front ends of these bars are threaded as at 7' and adapted to be screwed into threaded openings 7'' in the boxing 20 above described. 13 is an upright having at its lower end a fork 13' whose arms are bolted to the rear bars just in rear of the boxing, and this upright rises from the fork and follows the curvature of the the rear wheel—extending either to the point shown in full lines, or farther back over the rear wheel as shown in dotted lines so as to form a mud guard. 6 6 are brace rods bolted at their lower ends to the rear bars and at their upper ends to the upright. 12 is a brace bolted at its front end as at 12' to the front bar 14 just in rear of its pivoted front end, and at its rear end to the upright 13, preferably by the same bolts which secure the front ends of the rods 6 thereto. With this construction of framework, it will be obvious that if the chain becomes loose the rear bars 7 can be disconnected from the bearings for the rear axle and partially unscrewed from the boxing to tighten the chain; and to permit the framework from being sprung thereby slightly out of shape, the bolt 12' will be removed and the front bar 14 disconnected from the front fork and partially screwed into the boxing 20, and after the parts are replaced it will be found that the chain is tightened and yet the framework has not been loosened so that it will rattle. The front bar 14 may carry a footstep 5, and the upright 13 preferably carries a strap 8 or other suitable luggage carrier.

A second feature of my invention consists in the peculiar manner of adjustably mounting the seat support on a framework constructed as above described. 9 is the saddle which may be of any approved type and supported by a spring 10 also of any desired form. The spring 10 is detachably mounted on a plate or standard 11 by means of a bolt 10'. Said standard has a tongue 11' at its rear end, and 11'' is a bolt passing loosely through a slot 13'' in the upright and through a hole in said tongue. The head of the bolt stands preferably in rear of the upright, while its front end carries a thumb nut standing beneath the saddle. 25 is a screw having its upper end swiveled as at 26 through the standard 11, while its body passes obliquely downward and is screwed through the brace 12, and 27 is a jam nut on this screw above or below said brace. The general direction of the screw is about parallel with the adjacent portion of the upright 13, as best seen in Fig. 1. With this construction of seat support, when it is desired to adjust the height of the saddle, the thumb nut on the bolt 11″ is loosened by hand, and the jam nut 27 is loosened by a wrench, after which the screw 25 is turned in the proper direction (either by hand or by applying a wrench to its squared portion 25′) to raise or lower the standard 11 as may be desired. When the saddle has reached the proper height, the jam nut is again tightened to prevent the screw from turning, and the thumb nut on the bolt 11″ is also tightened to prevent the standard 11 from turning on the swivel 26.

The exact sizes, shapes, materials and proportions of parts are not essential to the successful operation of this device; as considerable change could be made in the details of construction without departing from the spirit of my invention. The whole is of any desired finish, according to the tastes of the manufacturer and purchaser.

Parts of the invention could be used without other parts, and obviously with or without other improved details as desired.

What is claimed as new is—

1. In a bicycle, the combination with the framework having a brace; of an upright screw screwing through said brace and having a squared portion for the reception of a wrench, a standard swiveled on the upper end of said screw, means for preventing the rotation of said standard, a spring removably mounted on the standard, and a saddle supported by the spring, substantially as described.

2. In a bicycle, the combination with the framework having a brace, and an upright provided with an upright slot; of a screw taking through said brace, a standard turning on said screw, a tongue projecting to the rear from said standard, a bolt extending through said slot and through a hole in the tongue, a thumb nut on the forward end of said bolt, and a saddle detachably mounted on the standard, substantially as described.

3. In a bicycle, the combination with the framework having a brace, and an upright provided with an upright slot above said brace; of a screw standing about parallel with the upright and taking through the brace, a jam nut on the screw adjacent said brace, a standard swiveled on the upper end of the screw, a rearwardly projecting tongue on said standard connected with the slot in the upright for preventing the rotation of the standard, and a saddle detachably supported by the standard, substantially as described.

4. In a bicycle of the safety type, the combination with the front and rear wheels, and a sprocket on the shaft of the rear wheel; of a crank shaft having a sprocket connected with that on the rear wheel, a boxing for said shaft, a framework having a front bar detachably connected at its forward end with the front wheel and exteriorly screw threaded whereby it is adjustably screwed at its rear end into said boxing, and two braces connected at their rear ends with the shaft of the rear wheel and adjustably connected at their front ends with said boxing, as and for the purpose set forth.

In testimony whereof I have hereunto subscribed my signature on this the 5th day of June, A. D. 1893.

WILLIAM ARTHUR SMITH.

Witnesses:
W. E. ALLEN,
M. A. CASTLE.